United States Patent [19]
Rutt et al.

[11] Patent Number: 6,058,690
[45] Date of Patent: May 9, 2000

[54] HARVESTER

[76] Inventors: Larry L. Rutt; R. LaDene Rutt, both of 2234 Road 181, Chappell, Nebr. 69129

[21] Appl. No.: 09/013,267

[22] Filed: Jan. 26, 1998

Related U.S. Application Data

[60] Provisional application No. 60/036,306, Jan. 29, 1997.

[51] Int. Cl.⁷ .................................................... A01D 46/00
[52] U.S. Cl. ............................................................ 56/327.1
[58] Field of Search .................................. 56/12.8, 12.9, 56/27.5, 130, 321, 327.1, 328.1, DIG. 8

[56] References Cited

U.S. PATENT DOCUMENTS

| | | | |
|---|---|---|---|
| 3,690,049 | 9/1972 | Roberson | 56/13.9 |
| 4,257,217 | 3/1981 | McClendon | 56/327 R |
| 4,402,175 | 9/1983 | Watenpaugh | 56/327 R |
| 4,546,602 | 10/1985 | Cosimati | 56/327 R |
| 4,884,392 | 12/1989 | Czajkowski et al. | 56/13.1 |
| 5,134,837 | 8/1992 | Casey et al. | 56/12.8 |
| 5,259,177 | 11/1993 | Windmuller et al. | 56/330 |
| 5,287,687 | 2/1994 | Urich et al. | 56/327.1 |
| 5,319,911 | 6/1994 | Wilhite | 56/328.1 |
| 5,427,573 | 6/1995 | Rutt et al. | 460/142 |

*Primary Examiner*—Robert E. Pezzuto
*Attorney, Agent, or Firm*—Michael Tobias

[57] ABSTRACT

A pepper harvester includes a picking mechanism for picking peppers from pepper plants. One or more air outlets are located forward of the front end of the picking mechanism. An air supply provides compressed air to the air outlets, which direct air streams backwards towards the picking mechanism or other portion of the harvester which can collect the peppers. During operation of the harvester, peppers which fall from pepper plants ahead of the picking mechanism are blown backwards by the air streams onto the picking mechanism to be collected, thereby increasing the yield of the harvester. The harvester can be used for other fruits or vegetables in addition to peppers.

44 Claims, 13 Drawing Sheets

HARVESTER

REFERENCE TO RELATED APPLICATIONS

This application claims the benefit of U.S. Provisional Application No. 60/036,306 filed on Jan. 29, 1997.

BACKGROUND OF THE INVENTION

1. Field of the Invention

This invention relates to a harvester capable of harvesting fruits or vegetables from low-growing plants. In particular but not exclusively, it relates to a pepper harvester.

2. Description of the Related Art

Various types of automatic harvesters have been developed for picking fruits or vegetables from low-growing plants. When a harvester is used to harvest plants growing in rows, the harvester moves along the rows and the plants are introduced into a picker head which is mounted on the harvester and which removes the fruits and vegetables from the plants.

During operation of such a harvester, a portion of the picker head may vibrate a plant being picked, causing some of the fruits or vegetables to fall off the plant and onto the ground ahead of the picker head without being collected by the harvester. With some types of plants, the amount of fruits or vegetables which fall off ahead of the picker head is quite significant. For example, in the case of chili pepper plants, with a conventional harvester, 10% or more of the peppers on the plants fall to the ground ahead of the picker head. Since pepper harvesters are not designed to pick up peppers off the ground, the peppers which have fallen to the ground end up being left in the field and wasted. As the peppers which fall off the plants and onto the ground tend to be the largest and hence most valuable ones, the lost income due to these peppers going unharvested is considerable.

Accordingly, there is a need for a harvester which can reduce the quantity of fruits or vegetables on plants being harvested which fall to the ground without being collected.

SUMMARY OF THE INVENTION

An object of the present invention is to provide a harvester for fruits or vegetables on low-growing plants, and particularly for peppers, which can recover a greater percentage of fruits or vegetables from plants being harvested than can conventional harvesters.

Another object of the present invention is to provide a method of harvesting fruits or vegetables with a high yield.

According to one form of the present invention, a harvester includes a picking mechanism for picking fruits or vegetables from a plant. An air outlet is located forward of the front end of the picking mechanism and is connected to a source of compressed air. The air outlet directs an air stream backwards towards the picking mechanism to blow fruits or vegetables which have fallen from a plant being harvested towards the picking mechanism or other portion of the harvester which can collect them, thereby enabling the fruits or vegetables to be harvested rather than falling to the ground.

According to another form of the present invention, a method of harvesting fruits or vegetables includes moving a picking mechanism along a path to pick fruits or vegetables from plants disposed along the path, and directing an air stream backwards from a location along the path ahead of the picking mechanism to blow fruits or vegetables which drop from the plants ahead of the picking mechanism towards the picking mechanism or other portion of the harvester which can collect the fruits or vegetables.

The picking mechanism need not be of any particular type. In a preferred embodiment, the picking mechanism comprises a plurality of elongated bars equipped with fingers, each finger undergoing orbital motion.

When the harvester is intended to be used to harvest plants growing in rows, the harvester preferably includes a pair of air outlets disposed on opposite widthwise sides of the picking mechanism, with the air streams from the pair of air outlets converging.

The velocity of the air stream from the air outlet is preferably adjustable so that it can be set to a suitable value corresponding to the weight of the fruits or vegetables to be picked.

A harvester according to the present invention is not restricted to use with a particular type of fruit or vegetable. It is particularly suitable for harvesting peppers, such as jalapeno peppers, cayenne peppers, bell peppers, long green peppers, and other varieties, but it can also be used to harvest other types of fruits or vegetables, such as pimentos, okra, tomatoes, green beans, and cucumbers.

DESCRIPTION OF PREFERRED EMBODIMENTS

Figure 1:
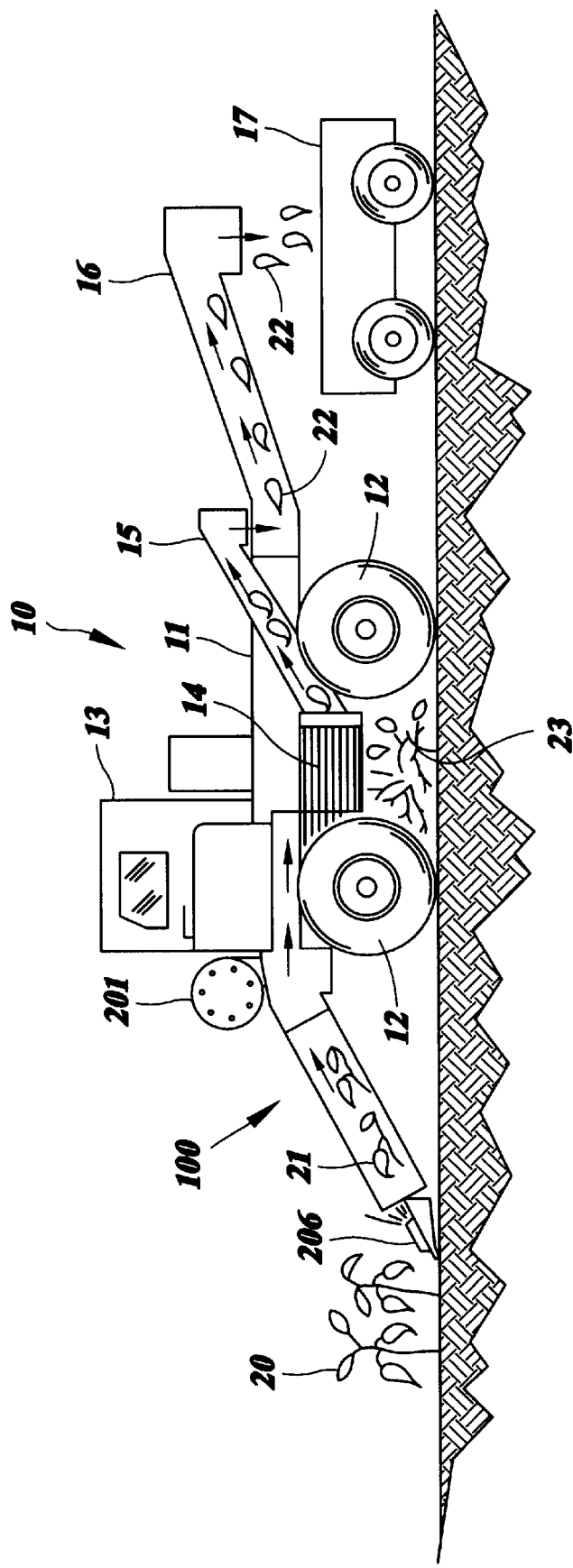
FIG. 1 is a schematic side elevation of an embodiment of a harvester according to the present invention.

FIG. 1 illustrates an embodiment of an automated harvester according to the present invention. The illustrated embodiment is being used to harvest peppers, such as jalapeno peppers.

The illustrated harvester includes a self-propelled vehicle 10 driven by an internal combustion engine or other drive source to move the harvester through fields of peppers to be harvested. The vehicle 10 includes a chassis 11 supported on wheels 12 and a cab 13 for the operator of the vehicle 10 mounted on the chassis 11. In addition to its own drive source, the vehicle 10 may include a power source, such as a hydraulic pump, for powering various equipment connected to it. Normally, the harvester travels from right to left in the figure along rows of pepper plants 20. On the front end of the vehicle 10 (the left end in FIG. 1) is mounted an automatic picker head 100 which is designed to strip peppers 21 from the upright pepper plants 20 as the harvester moves along the rows of plants. Leaves, stalks, and other debris are frequently attached to or admixed with the as-picked peppers 21. Therefore, the harvester may be equipped with a cleaner 14 for separating the debris from the peppers. An example of a particularly suitable cleaner 14 is described in U.S. Pat. No. 5,427,573 by Rutt et al. The cleaner 14 may be mounted on the harvester in any convenient location, such as on the underside of the chassis 11. The as-picked peppers 21 are automatically transported from the rear end of the picker head 100 to the cleaner 14.

The cleaner 14 has an intake end (the left end in the figure) which receives the output from the picker head 100 and a discharge end (the right end) connected to a conveyor 15. Inside the cleaner 14, stalks, leaves, and other debris 23 are separated from the peppers and fall onto the ground beneath the cleaner 14, while the cleaned peppers 22 are discharged through the discharge end of the cleaner 14 and onto the conveyor 15. The cleaned peppers 22 are carried by conveyor 15 to another conveyor 16, which discharges the cleaned peppers 22 into the bed of a trailer 17 or truck travelling behind the harvester. The rear conveyor 16 may be pivotally connected to the vehicle 10 for pivoting about a vertical axis in accordance with the location of the trailer 17.

Figure 2:
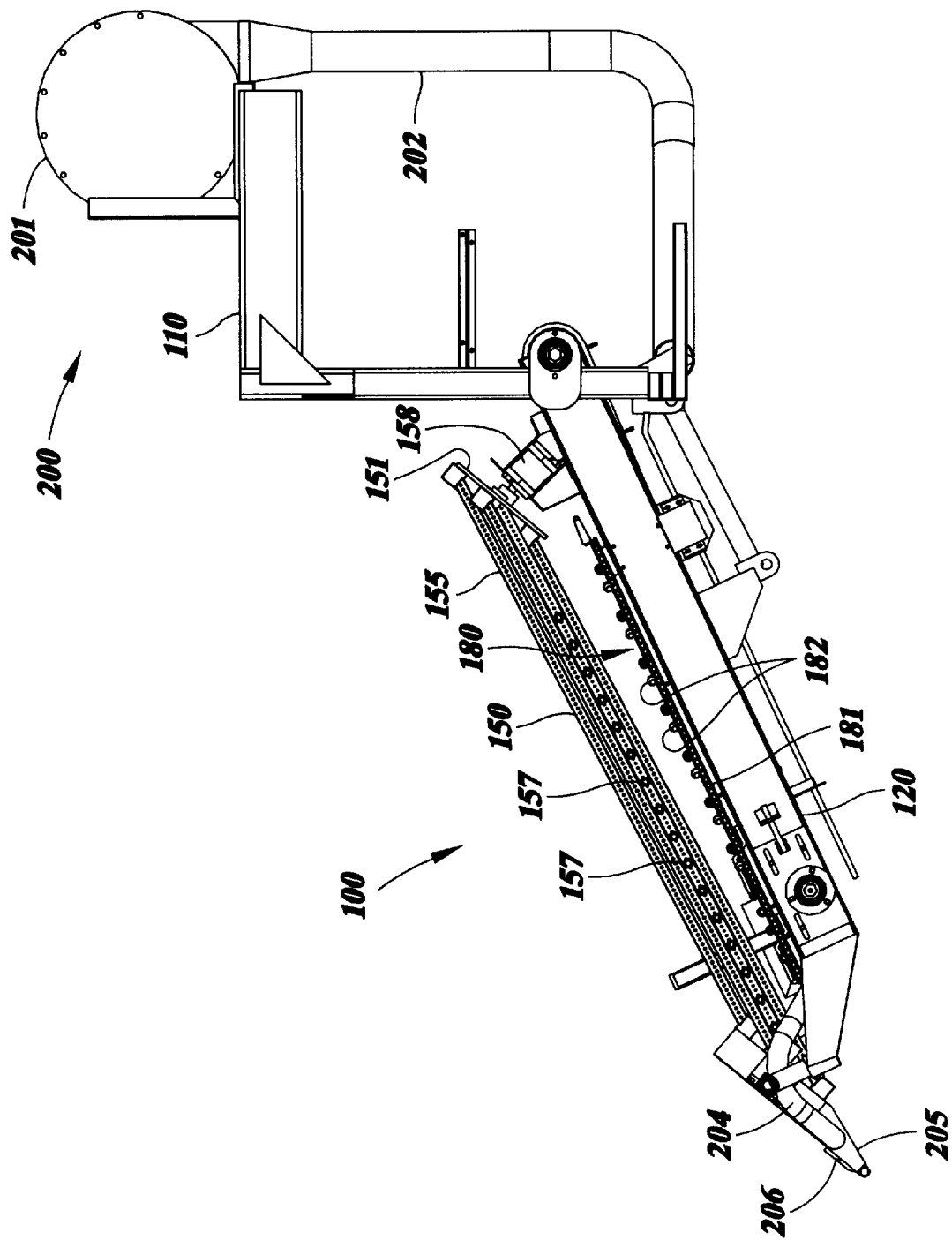
FIG. 2 is an enlarged side view of the picker head of the embodiment of FIG. 1.

FIG. 2 is a simplified side elevation of the picker head 100 with the vehicle 10 omitted for clarity. It includes a first frame 110 which can be mounted on the vehicle 10, and a second frame 120 which is mounted on the front of the first frame 110. One or more picking mechanisms 150 for stripping peppers from pepper plants are mounted on the second frame 120. The second frame 120 also supports a plurality of conveyors 170 (shown in FIG. 5) which transport peppers which have been picked from plants by the picking mechanisms 150 towards the rear of the picker head 100 onto another set of conveyors 190 and 191 (shown in FIG. 9) which feed the peppers into the cleaner 14. A pushing mechanism 180 may be associated with each conveyor 170 to help push peppers and debris up the conveyor 170. The picker head 100 also includes an air system 200 including a blower 201 and a series of ducts which transport compressed air from the blower 201 to one or more backwardly directed air outlets 206 located at the front of the second frame 120. Air which is discharged from the air outlets 206 blows peppers which fall from plants ahead of the picking mechanisms 150 backwards onto the picking mechanisms 150 or other portion of the picker head 100 before the peppers can hit the ground.

Figure 3:
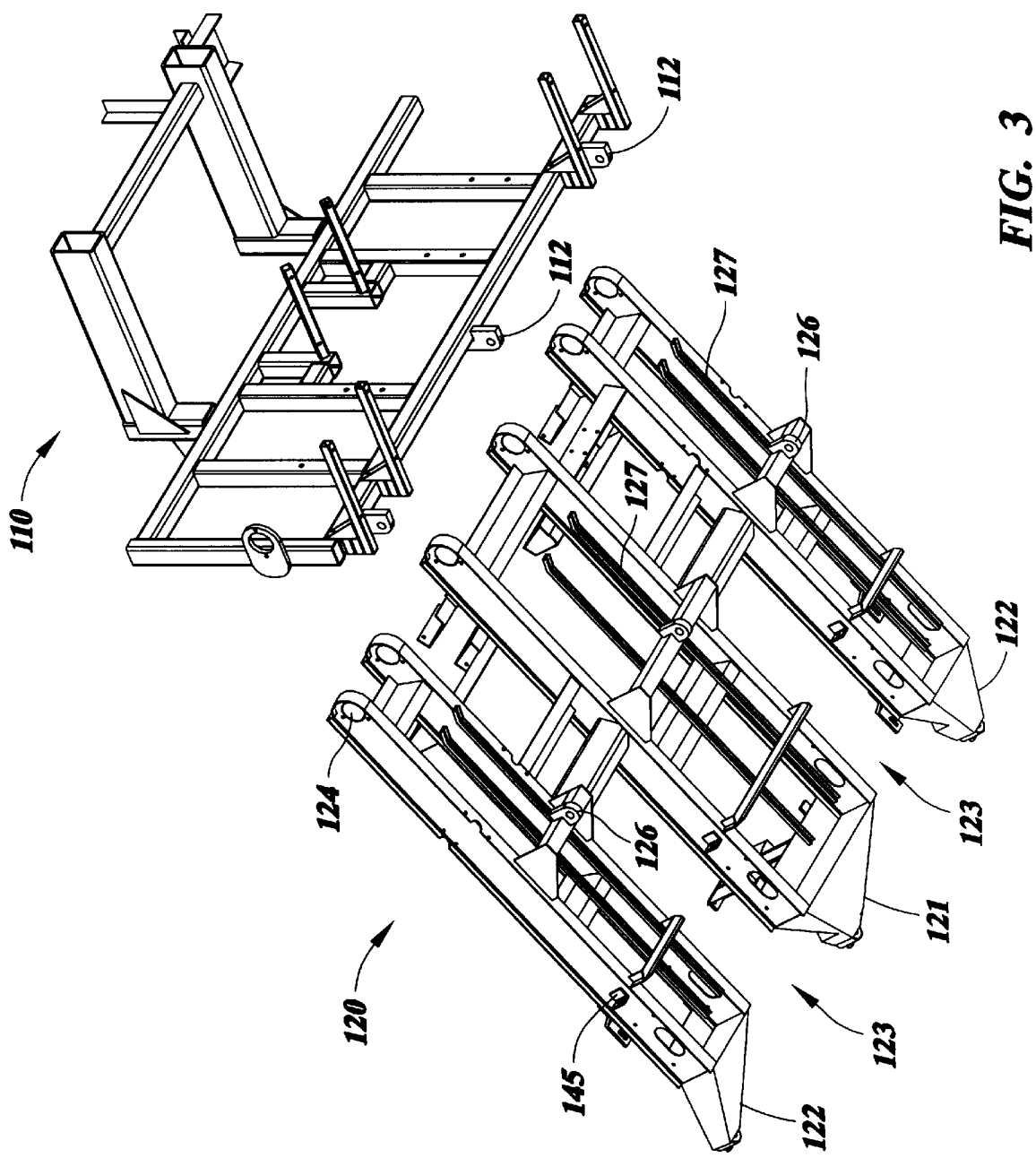
FIG. 3 is a bottom isometric view of a first and second frame of the picker head in a partially disassembled state.
Figure 4:
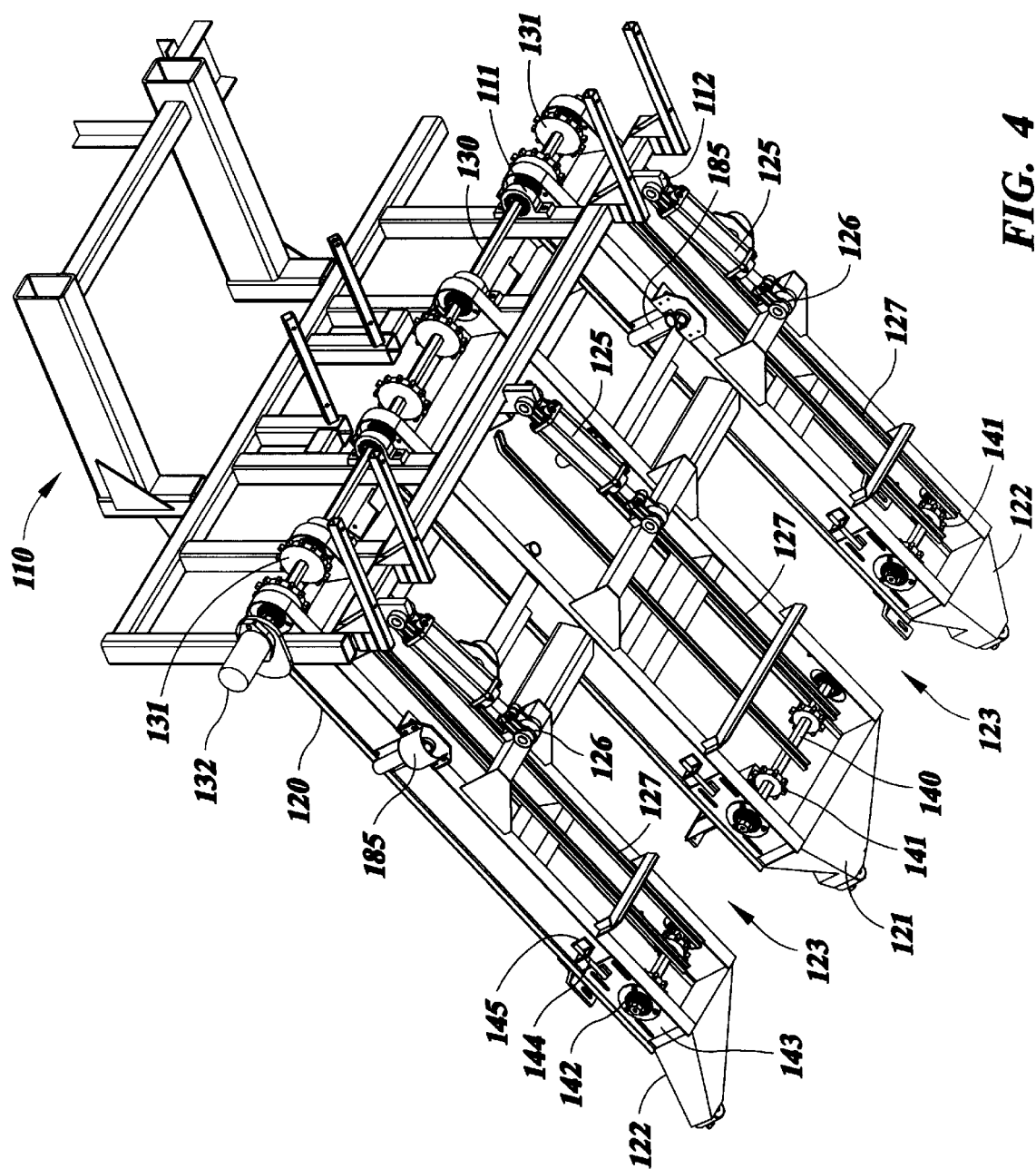
FIG. 4 is a bottom isometric view of the frames of the picker head in an assembled state and a drive mechanism for conveyors.

FIG. 3 illustrates the frames 110, 120 of the picker head 100 in a partially assembled state, and FIG. 4 shows the frames as assembled. The second frame 120 can be supported by the first frame 110 in any suitable manner. Preferably, the second frame 120 is pivotable with respect to the first frame 110 to permit the height of the front ends of the picking mechanisms 150 to be adjusted. In the present embodiment, the rear end of the second frame 120 is pivotably mounted on a rotating drive shaft 130, which in turn is rotatably supported by bearing mounts 111 secured to the rear of the first frame 110.

The second frame 120 can have any structure which enables it to support one or more picking mechanisms 150 so that the picking mechanisms 150 can access pepper plants growing in rows. In the present embodiment, the second frame 120 has a center section 121 and two side sections 122 on either widthwise side of the center section 121. The side sections 122 are spaced from the center section 121 by gaps 123 each large enough so that a row of peppers plants can pass through it. The center-to-center distance between two adjoining gaps 123 is approximately equal to the normal center-to-center distance between two adjoining rows of pepper plants in a field. The second frame 120 is not restricted to having three sections 121, 122 and may have a larger or smaller number of sections in accordance with the number of rows it is desired to harvest at the same time.

The second frame 120 can be pivoted about the drive shaft 130 with respect to the first frame 110 by one or more drive members of any suitable type, such as hydraulic cylinders 125 or motors, levers, pneumatic cylinders, etc., connected between the first and second frames 110, 120. In FIG. 4, one end of each cylinder 125 is pivotably connected to a lug 112 on the underside of the first frame 110 and the other end of the cylinder 125 is pivotably connected to a lug 126 on the underside of the second frame 120. The hydraulic cylinders 125 can be powered by a source of hydraulic fluid on the vehicle 10.

The picking mechanisms 150 need not have any particular structure and any type of picking mechanisms suitable for the fruits or vegetables to be harvested may be employed.

Figure 7:
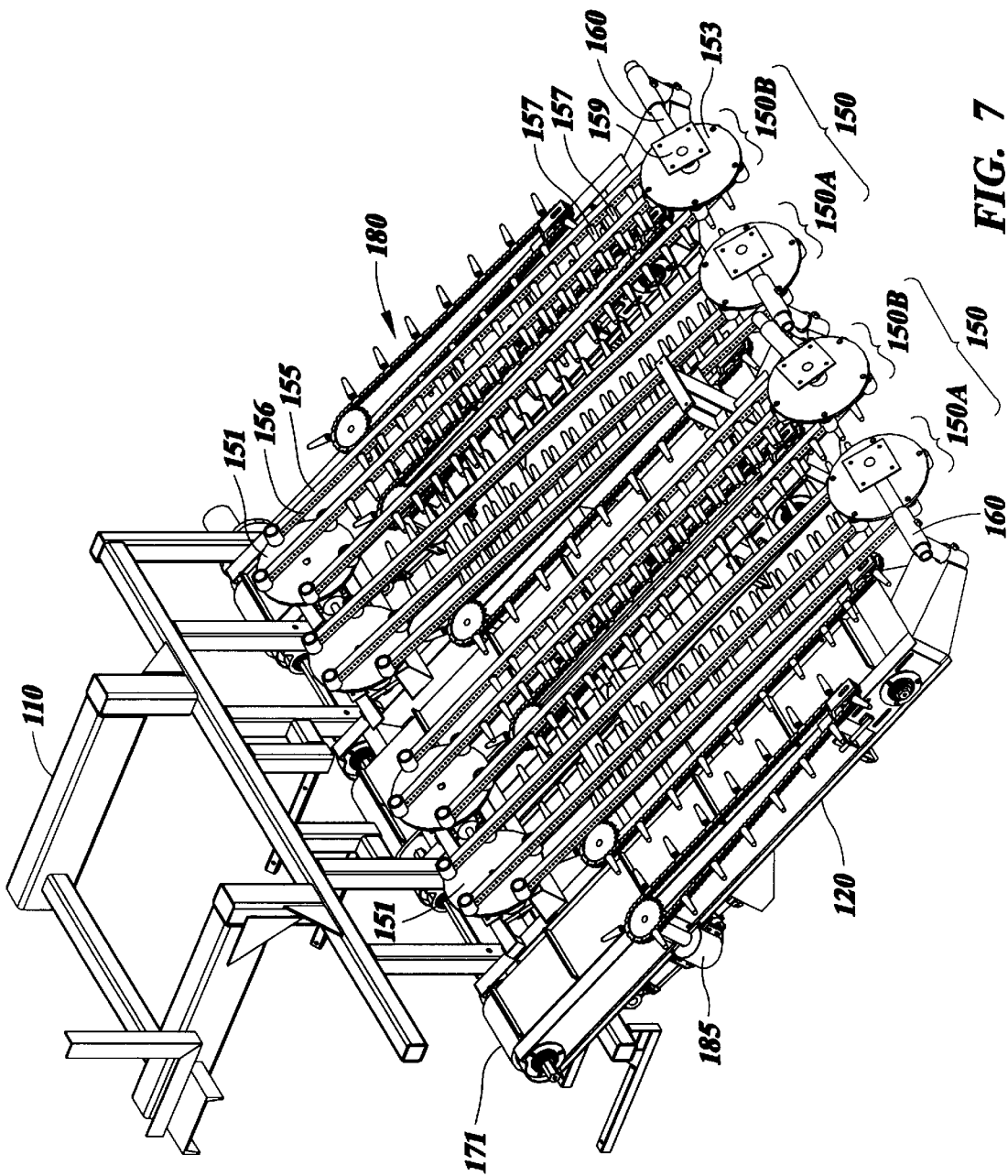
FIG. 7 is a top isometric view showing picker bars of the picking mechanisms of the picker head.
Figure 8:
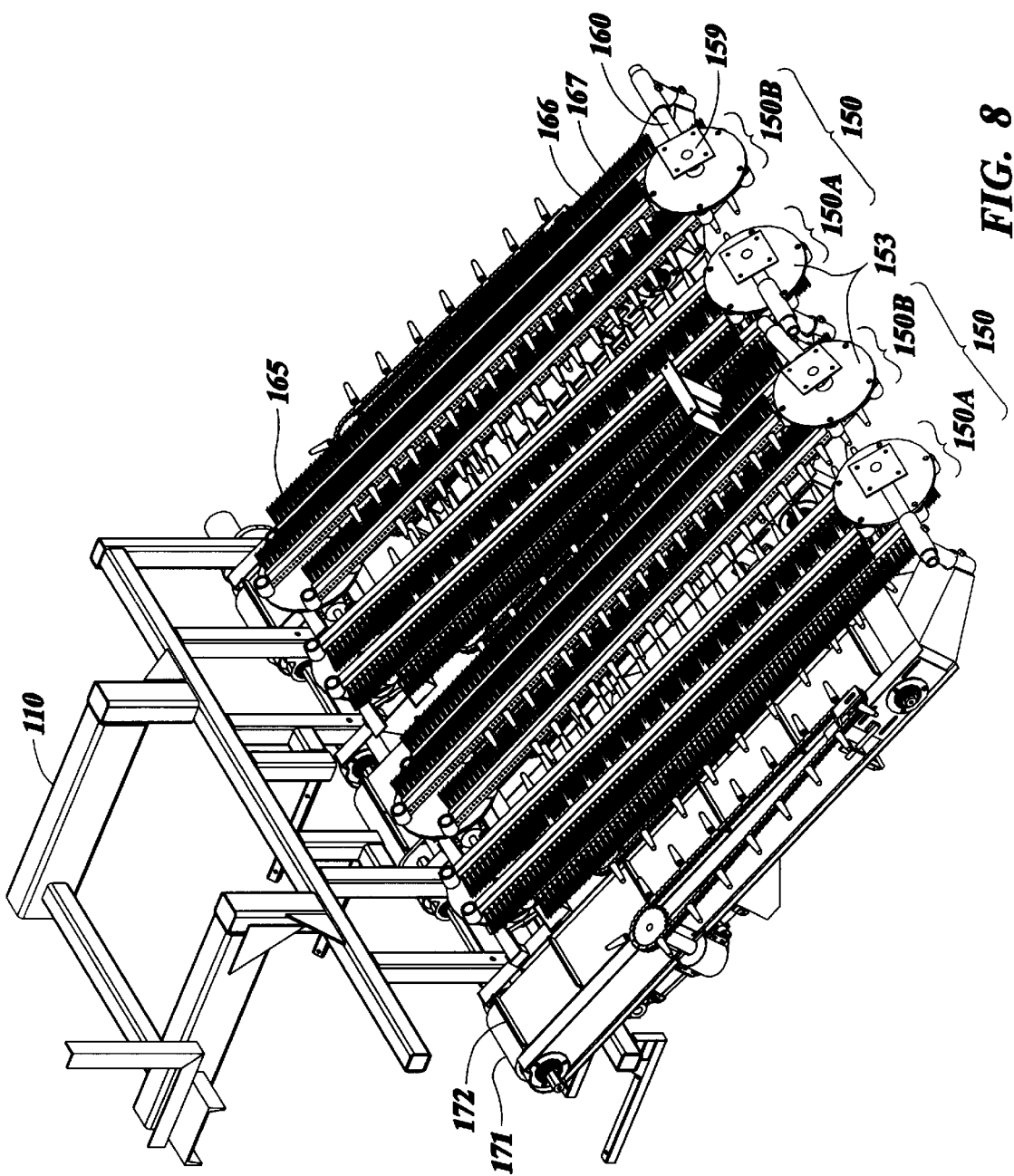
FIG. 8 is a top isometric view showing brushes of the picking mechanisms.

The illustrated picking mechanisms 150, best shown in FIGS. 7 and 8, are similar to those described in U.S. Pat. No. 5,287,687 entitled "Harvesting Apparatus", which is incorporated by reference. There may be any number of picking mechanisms 150, depending upon the number of rows of plants it is desired to harvest at the same time. The illustrated embodiment includes two picking mechanisms 150 and can therefore harvest two rows of pepper plants simultaneously. The two picking mechanisms 150 are disposed in parallel and have a center-to-center spacing equal to the typical center-to-center spacing of two adjacent rows of pepper plants.

Each picking mechanism 150 comprises two halves 150a and 150b disposed side by side and generally parallel to each other. Each half 150a and 150b of one of the picking mechanisms 150 includes a pair of rotating disks 151 and 153 spaced from each other in the lengthwise direction of the second frame 120. In each half 150a, 150b a plurality of elongated bars 155 extend parallel to each other between the two disks 151, 153. The rear end of each bar 155 is rotatably connected to one of the upper disks 151 by a greaseless bearing, for example, and the front end of each bar 155 is rotatably connected to one of the lower disks 153 in a similar manner. The disks 151, 153 lie in parallel planes, which will typically be sloped with respect to the horizontal and have parallel rotational axes. The bars 155 extend in lines which are non-parallel to the planes of the disks 151, 153. As the disks 151, 153 rotate, each portion of each bar 155 travels along a circular orbit parallel to the planes of the disks 151, 153. The upper and lower disks 151, 153 of each half 150a, 150b are rotated about their respective axes at the same rate. A drive mechanism can be provided for both disks 151, 153 of each half 150a and 150b, or a drive mechanism can be provided for rotating just one of the disks and the other disk can be rotated by force transmitted to it from the one disk by the bars 155. The disks 151, 153 in one half 150a of each picking mechanism 150 are rotated in the opposite direction from the disks in the other half 150b. In this embodiment, the disks 151, 153 in half 150a rotate in a counterclockwise direction and the disks in half 150b rotate in a clockwise direction as viewed from above.

Figure 6:
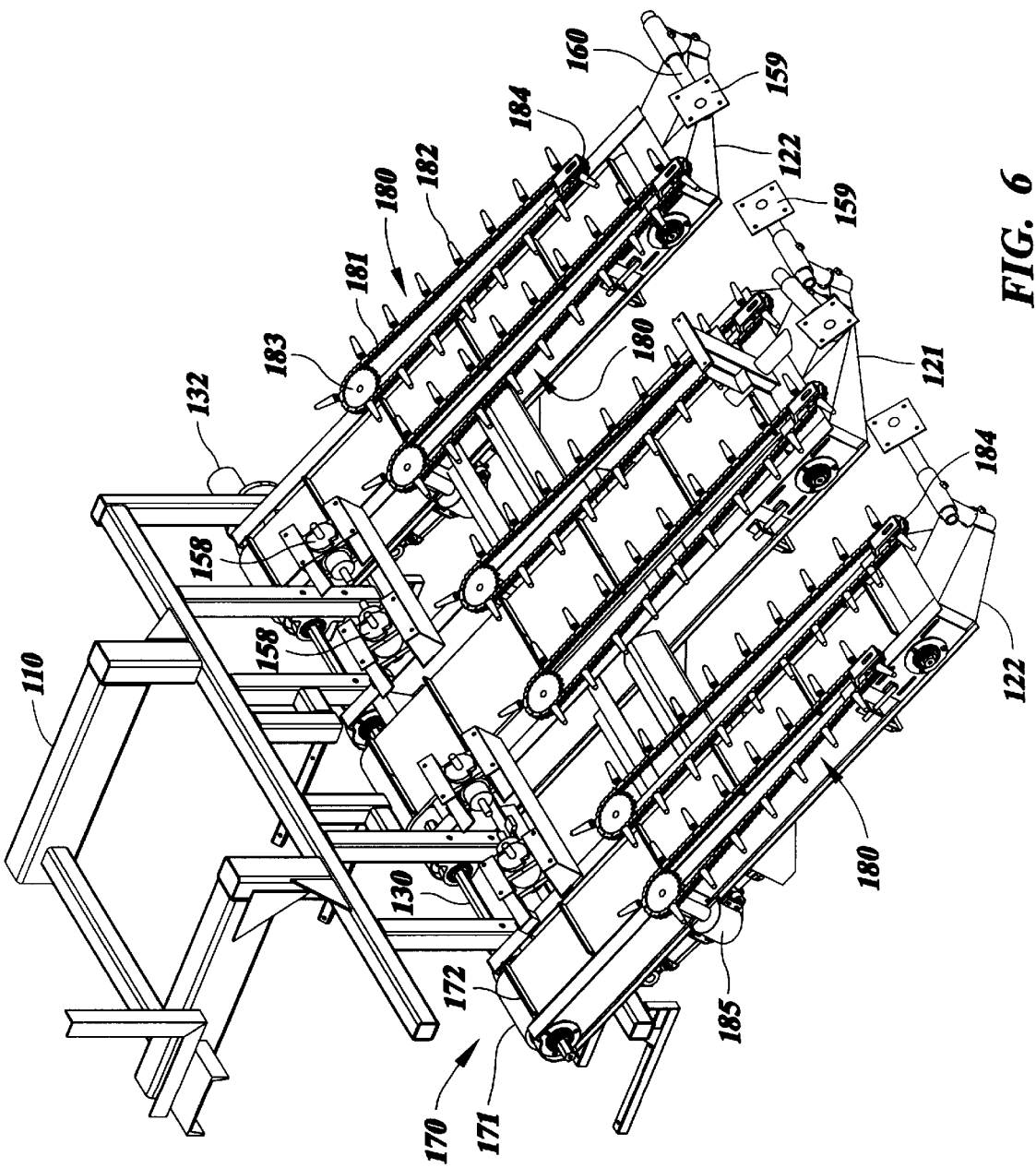
FIG. 6 is a top isometric view showing pushing mechanisms for the conveyors of FIG. 5.

In the present embodiment, each of the front upper disks 151 of each picking mechanism 150 is driven, while the lower disk 153 is rotated by torque transmitted to it from the upper disk 151 through the bars 155. The upper disks 151 can be driven by any suitable mechanism. As shown in FIG. 6, a right angle gear box 158 is provided for each upper disk 151. Each gear box 158 has an input shaft (facing in the widthwise direction of the picker head 100) which is driven by an unillustrated belt passing around a sprocket on the drive shaft 130 and a sprocket on the input shaft, and an output shaft (facing upwards and forwards) which is drivingly connected to the upper disk 151. The lower disks 153 are rotatably mounted on the underside of support plates 159 secured to support arms 160 mounted on the front of the second frame 120.

In the present embodiment, the separation between the two halves 150a, 150b of each picking mechanism 150 can be adjusted in accordance with the width of the rows of peppers to be picked. The support arms 160 which support the lower disks 153 can slide on the second frame 120 in the widthwise direction and be fixed to the second frame 120 at desired locations by set screws, for example, thereby enabling the separation between the lower disks 153 to be adjusted. The widthwise separation between the upper disks 151 remains constant in this embodiment, but the upper disks 151 may also be supported such that their separation can be varied. At certain widthwise positions of the lower disks 153, the bars 155 in one half 150a of a picking mechanism 150 will be at an acute angle to the bars 155 in the other half 150b, but since the angle is small, it does not adversely affect the operation of the picking mechanism 150.

A plurality of elongated picking fingers 157 for stripping peppers from plants are attached to the side of each bar 155 facing towards the other half of the picking mechanism 180. Preferably, the picking fingers 157 are flexible so that when a finger 157 contacts a thick branch or stem of a plant, the finger 157 will yield rather than breaking off the branch or stem. This ability of the fingers 157 to bend results in a smaller amount of debris being stripped off the pepper plants than if the fingers 157 were rigid. Flexible rubber fingers used in the concrete industry for moving aggregate are particularly suitable for use as the fingers 157 in the present invention. These fingers 157 have a flexible rubber body attached at one end to an internally threaded metal base, into which a bolt or other threaded member can be screwed. The fingers 157 may be secured to the bars 155 in any desired manner. In the present embodiment, each bar 155 is formed with bolts holes 156 at regular intervals (every inch or half inch, for example) along its length, and each finger 157 is attached to one of the bars 155 by a bolt which passes through one of the holes 156 and screws into the metal base of the finger 157. The spacing between adjacent fingers 157 can be selected based on the size of the peppers to be picked. A typical spacing is on the order of 2–3 inches.

Preferably, the rear side of each bar 155 (the side opposite from the side on which the fingers 157 are attached) is equipped with a support member which can prevent peppers which have been picked from a plant by the fingers 157 from falling downwards between the bars 155 and which can push the picked peppers to the widthwise sides of the picking mechanism 150 where the peppers can be collected. In the present embodiment, as shown in FIG. 8, each support member comprises an elongated brush 165 secured to the rear side of one of the bars 155. Each brush 165 comprises an elongated frame 166 of wood or other material secured to the bar 155 by bolts, for example, and a plurality of bristles 167 secured to the frame 166 and extending in the widthwise direction of the picking mechanism 150. The bristles 167 are preferably long enough to overlap the fingers 157 on an adjoining bar 155 so that if peppers slip through the spaces between fingers 157 on the adjoining bar 155, the peppers will be caught by the bristles 167 and prevented from falling to the ground. The brushes 165 may comprise commercially available brush stock which is cut to a desired length and then secured to the bars 155 in any suitable manner.

The picking mechanisms 150 operate in the same manner as the picking mechanisms disclosed in U.S. Pat. No. 5,287,687, mentioned above, so an explanation of their operation will be omitted.

The conveyors 170 are provided for transporting peppers which have been picked from plants by the picking mechanisms 150 towards the rear of the second frame 120 where the peppers can be fed into the cleaner 14. The conveyors 170 may be provided in any location where they can receive peppers from the picking mechanisms 150. The illustrated picking mechanisms 150 move picked peppers in the widthwise direction of the harvester, so the conveyors 170 are arranged on the widthwise sides of the picking mechanisms 150 and extend in the fore and aft direction of the harvester. Two conveyors 170 are disposed on the outer widthwise sides of the picking mechanisms 150, and a third conveyor 170 is disposed at the middle of the second frame 120 between the two picking mechanisms 150. Each of the two outer conveyors 170 receives peppers from the picking mechanism 150 closest to it, while the middle conveyor 170 receives peppers from the picking mechanisms 150 on both sides of it. The conveyors 170 may have any structure which enables them to transport peppers. In the present embodiment, each conveyor 170 includes an endless conveyor belt 171 which passes around drive sprockets 131 secured to the drive shaft 130 at the rear of the second frame 120 and idle sprockets 141 mounted on freely rotating idle shafts 140 (shown in FIG. 4) rotatably supported near the front end of the second frame 120. When the drive shaft 130 is rotated by a suitable drive mechanism, such as by hydraulic motors 132 mounted on the first frame 110, the conveyor belts 171 circulate along a path passing around the drive sprockets 131 and the idle sprockets 141. Each conveyor belt 171 has a plurality of plates 172 projecting from its outer surface at intervals and extending in the widthwise direction of the belt 171. The plates 172, which move with the conveyor belt 171, prevent peppers deposited onto the conveyor belt 171 by the picking mechanism 150 from rolling down the conveyor belt 171. As shown in FIG. 4, elongated skids 127 may be mounted on the underside of the second frame 120 beneath the conveyor belts 171 to prevent the conveyor belts 171 from striking against the ground or catching on portions of the second frame 120.

The tension in the conveyor belts 171 can be adjusted by means of tension adjusting mechanisms associated with the idle shafts 140. Each of the idle shafts 140 is rotatably supported by a bearing 142 mounted on a plate 143 which is slidably mounted on the second frame 120 for movement in the lengthwise direction of the second frame 120. A threaded rod 144 is secured to each plate 143 and extends through an angle iron 145 secured to the side of the second frame 120. By turning unillustrated nuts attached to the rod 144, the plate 143 can be translated in the lengthwise direction of the second frame 120 to adjust the position of the idle shaft 140 and vary the tension in the conveyor belt 171.

Along with peppers, the picking mechanisms 150 may strip twigs, leaves, and other debris from the plants being picked and deposit this debris on the conveyors 170. Such debris has a tendency to accumulate at the bottom ends of the conveyor belts 171 without being carried upwards. Therefore, as shown in FIG. 6, each conveyor 170 may be equipped with a pushing mechanism 180 for assisting the conveyor 170 in transporting debris upwards towards the rear of the second frame 120. Each pushing mechanism 180 comprises an endless chain 181 installed on the second frame 120 so as to circulate alongside one of the conveyor belts 171 and a plurality of pushing members attached to the chain 181 at intervals and overlapping one of the conveyor belts 171 in the widthwise direction of the conveyor belt 171. The pushing members need not be of any particular structure. In the present embodiment, the pushing members comprises elongated fingers 182 secured to the chains 181. The fingers 182 need not be flexible, but in the present embodiment, for convenience, the fingers 182 are identical to the flexible fingers 157 employed in the picking mechanisms 150.

Each of the conveyors 170 has a pushing mechanism 180 on either widthwise side, although it may be sufficient to provide a single pushing mechanism 180 for each conveyor 170. The chain 181 of each pushing mechanism 180 passes around a first sprocket 183 located towards the rear of the second frame 120 and a second sprocket 184 located towards the front of the second frame 120. One or both of the sprockets 183, 184 may be rotatably driven to move the chain 181 along an endless path. In the present embodiment, each of the first sprockets 183 is driven by the drive shaft 130 on the first frame 110 through an unillustrated series of belts and shafts connected between the drive shaft 130 and a right angle gear box 185 connected to each of the first sprockets 183, while the second sprockets 184 are idle sprockets and are rotated by engagement with the chains 181. Preferably, the position of one or both of the sprockets 183, 184 in the lengthwise direction of the second frame 120 can be varied to adjust the tension in the corresponding chain 181.

The pushing mechanisms 180 can extend over any desired length of each conveyor 170. The front ends of the chains 181 are preferably as close as possible to the front ends of the conveyors 170 and may even be forward of the front ends to prevent the accumulation of debris. The fingers 182 may be at any height above the conveyor belts 171 such that they do not interfere with the operation of the conveyor belts 171 and may either contact or pass above peppers on the conveyor belts 171. The speed of movement of the fingers 182 is preferably equal to or greater than the speed of the conveyor belts 171. For example, satisfactory results may be obtained with the speed of the fingers 182 being approximately 10% greater than the speed of the conveyor belts 171.

Figure 5:
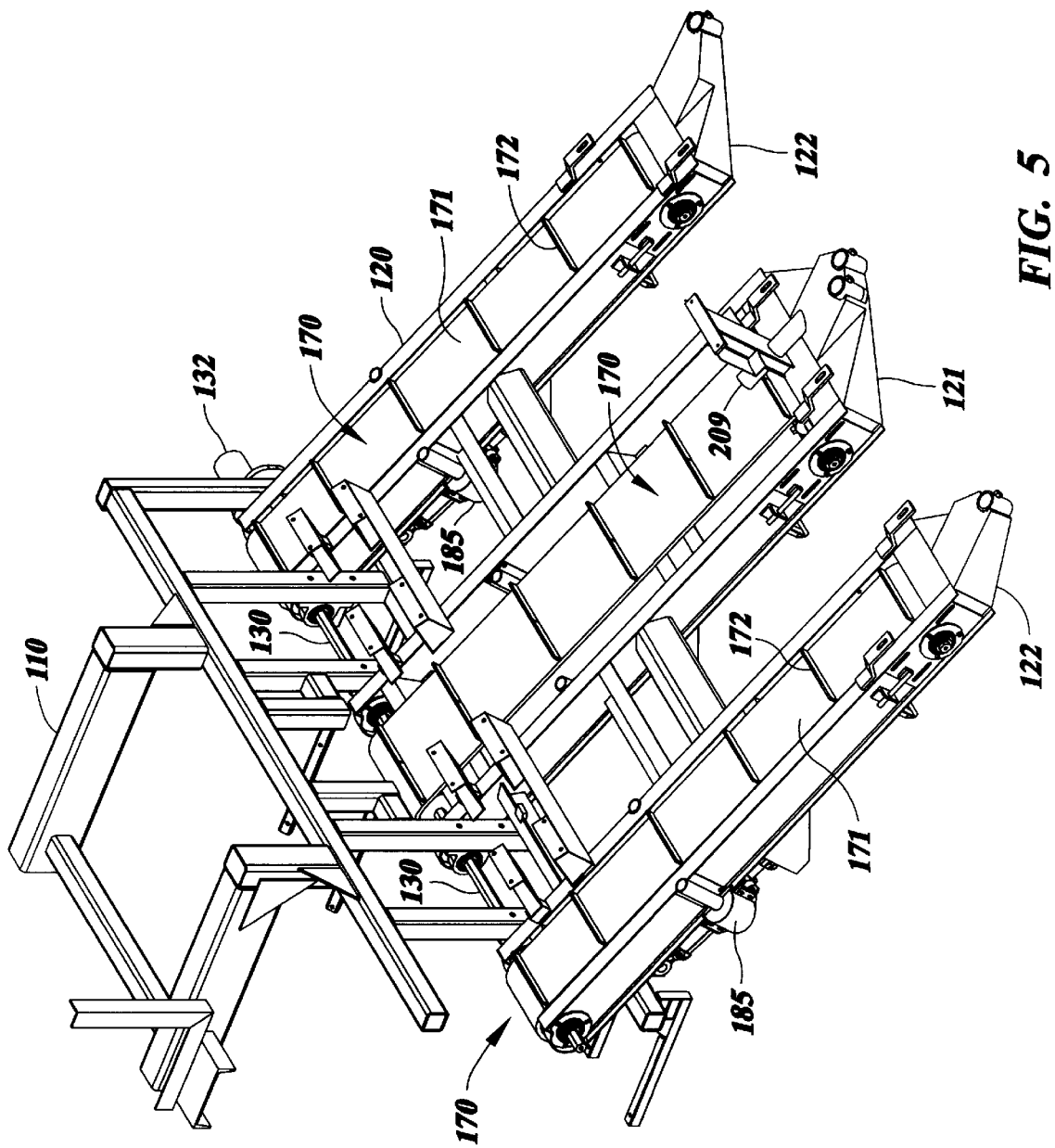
FIG. 5 is a top isometric view of the frames of the picker head and conveyors for transporting peppers and debris toward the rear of the picker head.
Figure 9:
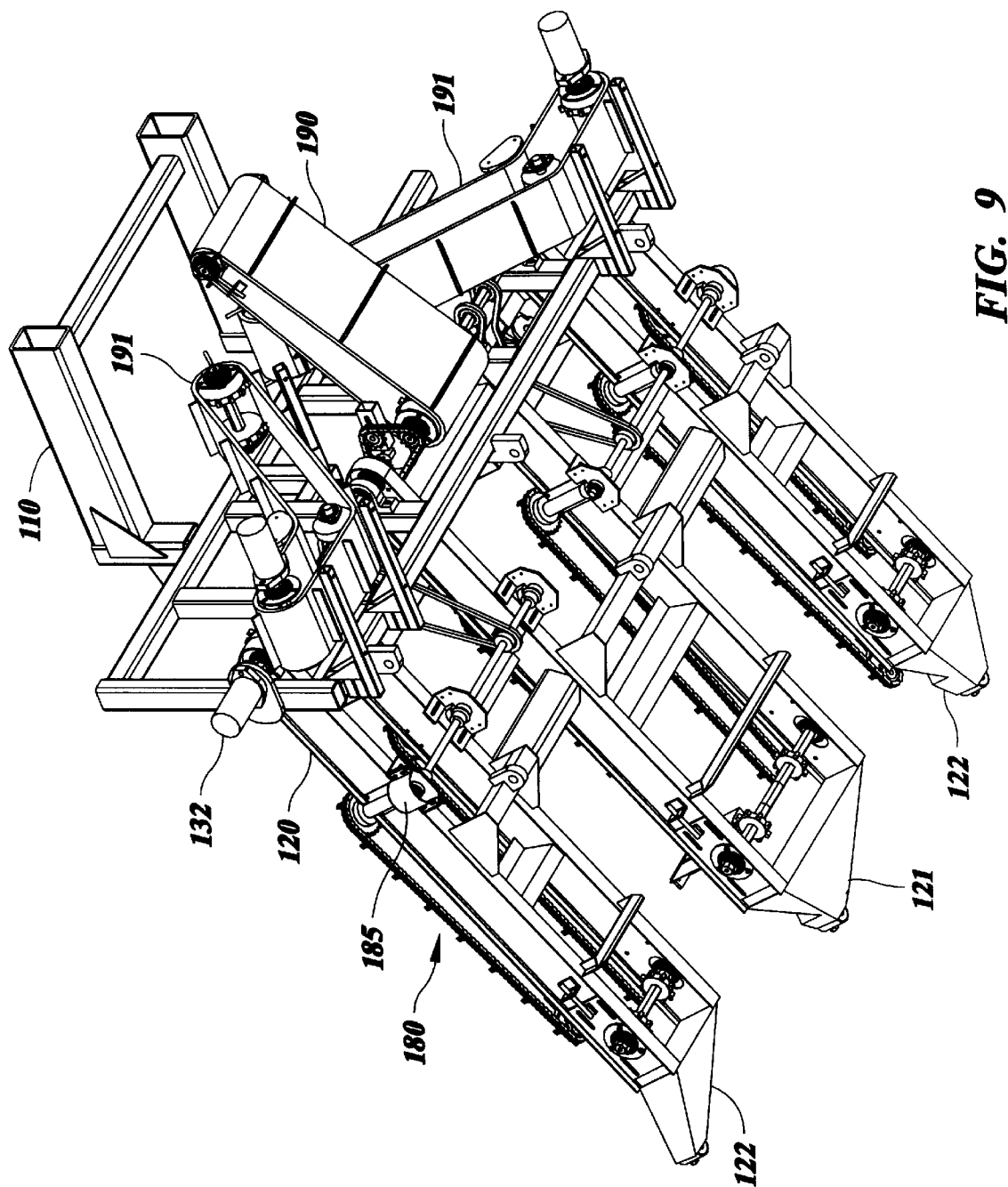
FIG. 9 is a bottom isometric view showing conveyors which introduce peppers and debris into the cleaner of the harvester.
Figure 10:
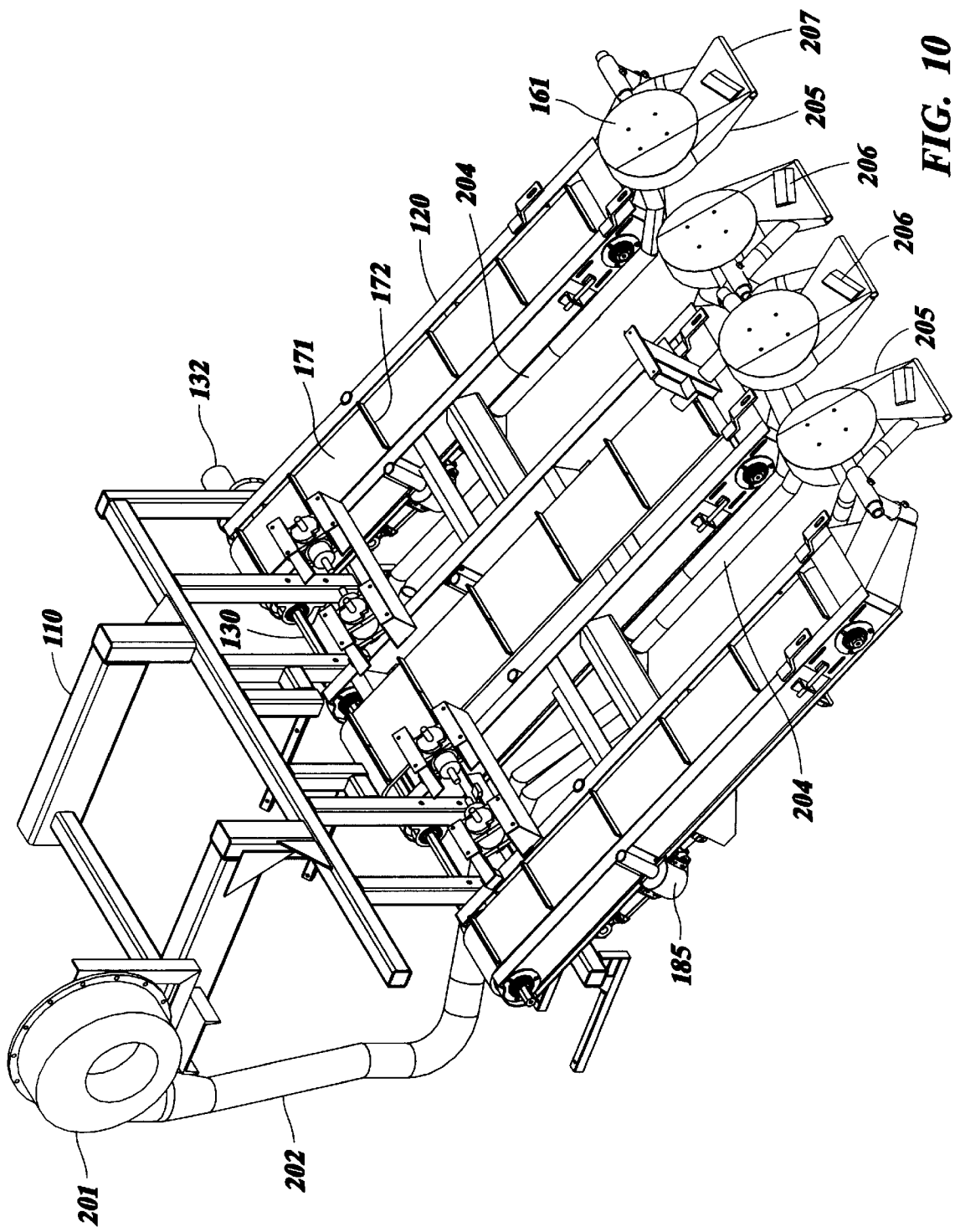
FIG. 10 is a top isometric view showing an air system mounted on the frames of the picker head.
Figure 11:
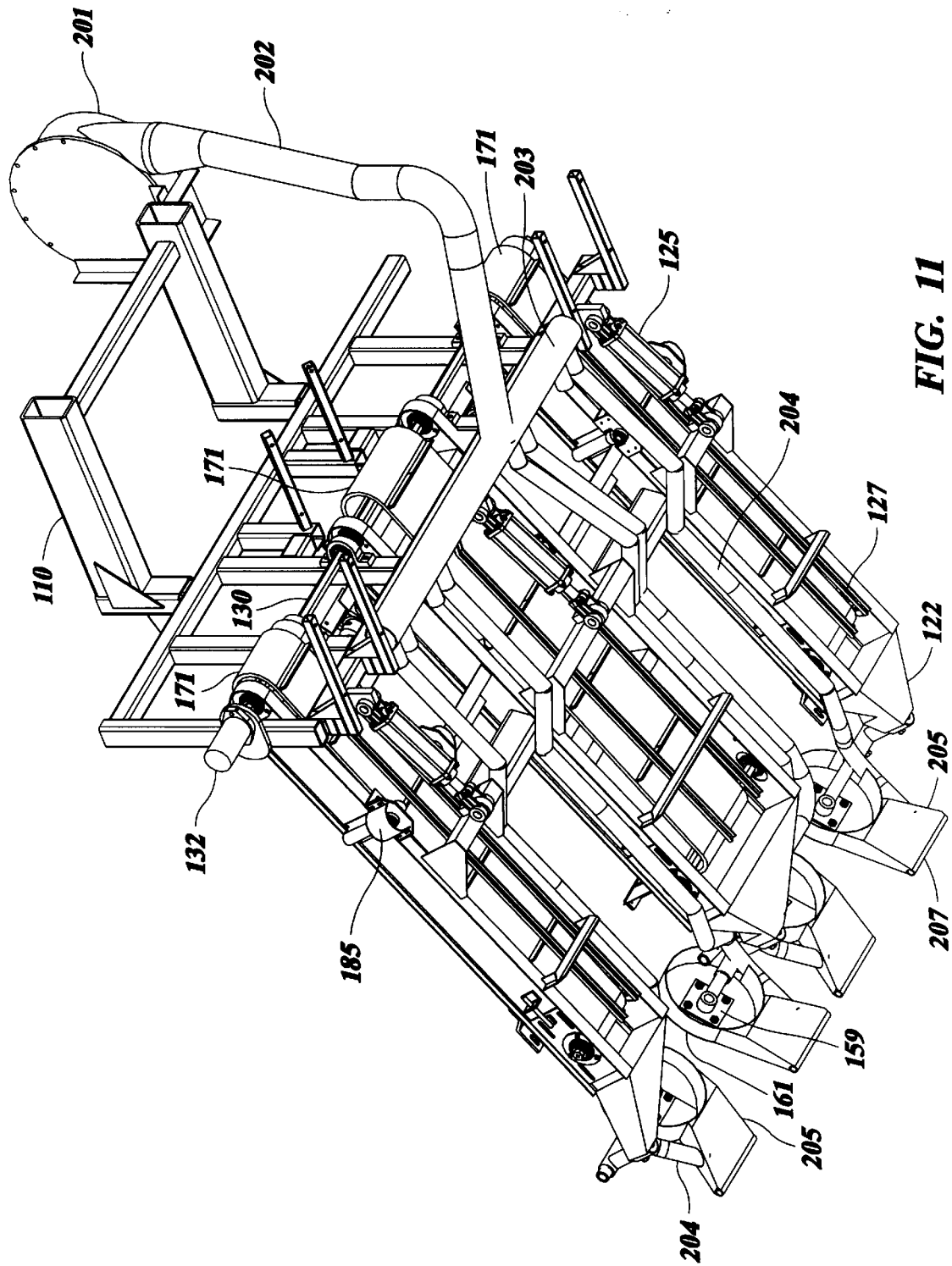
FIG. 11 is a bottom isometric view of the arrangement shown in FIG. 10.

As shown in FIG. 9, three belt conveyors 190 and 191, which may be similar in structure to the conveyors 170 for the picking mechanisms 150, are mounted on the rear of the first frame 110 adjoining the rear ends of conveyors 170. Peppers and debris transported by the middle of the three conveyors 170 in FIG. 5 are deposited onto the central conveyor 190 in FIG. 9 and are transported by this conveyor 190 to the cleaner 14. Peppers and debris transported by the two outer conveyors 170 in FIG. 5 are fed onto the two outer conveyors 191 in FIG. 9 and are transported laterally by these conveyors 191 onto the central conveyor 190, which then transports these materials to the cleaner 14.

FIGS. 10–13 illustrate the air system 200 employed in this embodiment for preventing peppers from falling to the ground ahead of the picking mechanisms 150. The air system 200 includes a source of compressed air 201, a plurality of air outlets 206 at the front end of the second frame 120 for directing air streams generally backwards towards the picking mechanisms 150, and a series of conduits 201–205 connecting the source of compressed air 201 to the air outlets 206.

The source of compressed air 201 may have any desired structure. In the present embodiment, it comprises a centrifugal blower mounted on the first frame 110 and powered by an unillustrated motor or other drive mechanism of any suitable type. The openings in the air outlets 206 from which the air streams are discharged are preferably disposed as close to the front end of the harvester as possible to reduce the likelihood of peppers dropping to the ground ahead of the outlets 206 where they can not be acted on by the air streams from the air outlets 206. Furthermore, the openings of the air outlets 206 are preferably as close to the ground as possible so that the air streams from the air outlets 206 will act on falling peppers from below. An example of a suitable range for the height of the openings of the air outlets 206 is 1 to 5 inches and more preferably 1 to 3 inches off the ground. Having the openings of the air outlets 206 as close to the ground as possible not only increases the likelihood of the air streams from the air outlets 206 acting on falling peppers, it also enables the picking mechanisms 150 to pick low lying peppers which have not fallen off a plant but which are situated so low on the plant (perhaps even resting on the ground) that the peppers would normally pass beneath the picking mechanisms 150. The air streams from the air outlets 206 can act on these low lying peppers or on stems and leaves attached to the peppers and lift the peppers up into the path of movement of the picking mechanisms 150, thereby enabling the picking mechanisms 150 to pick the peppers.

Figure 12:
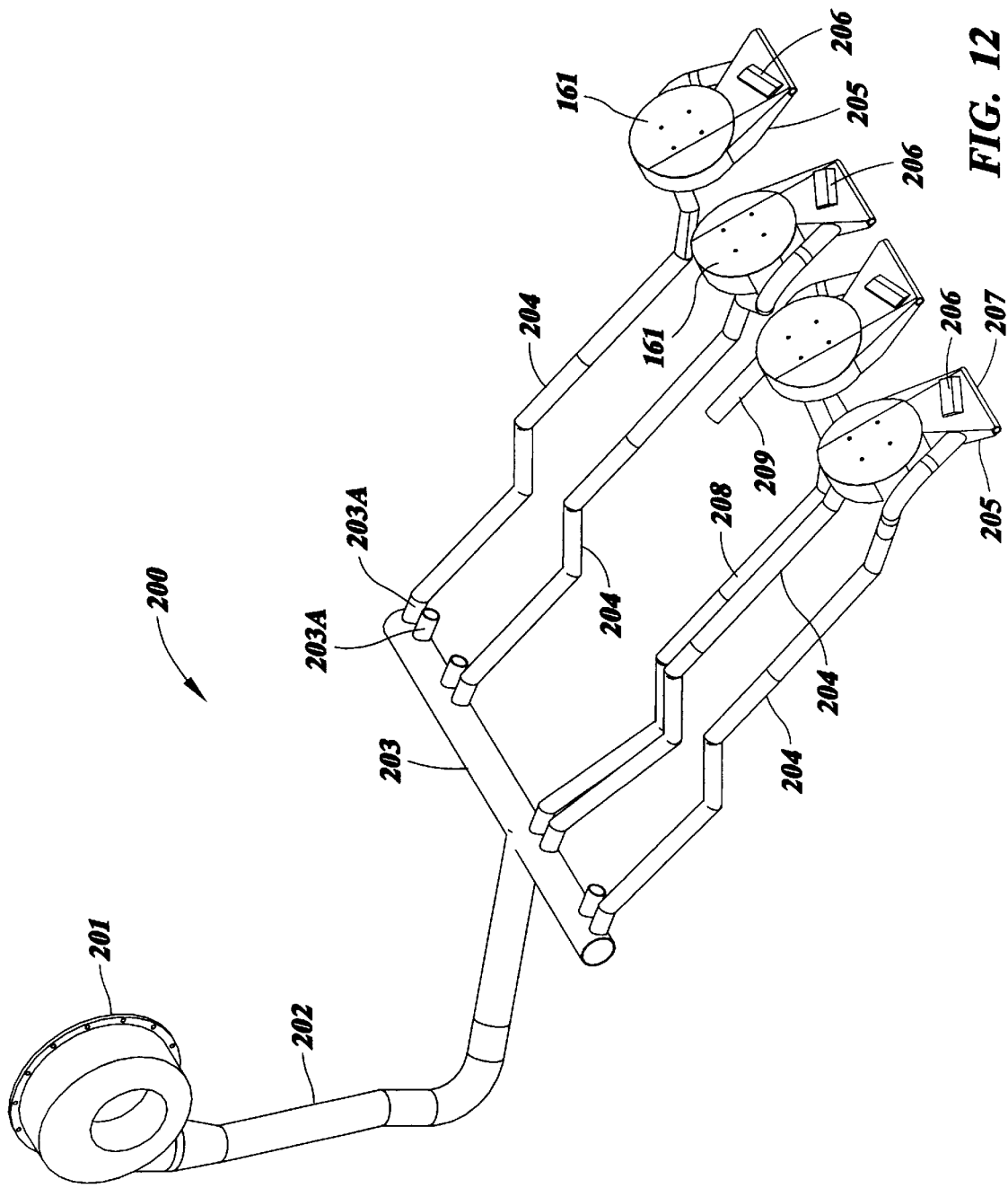
FIG. 12 is a top isometric view of the air system in isolation.
Figure 13:
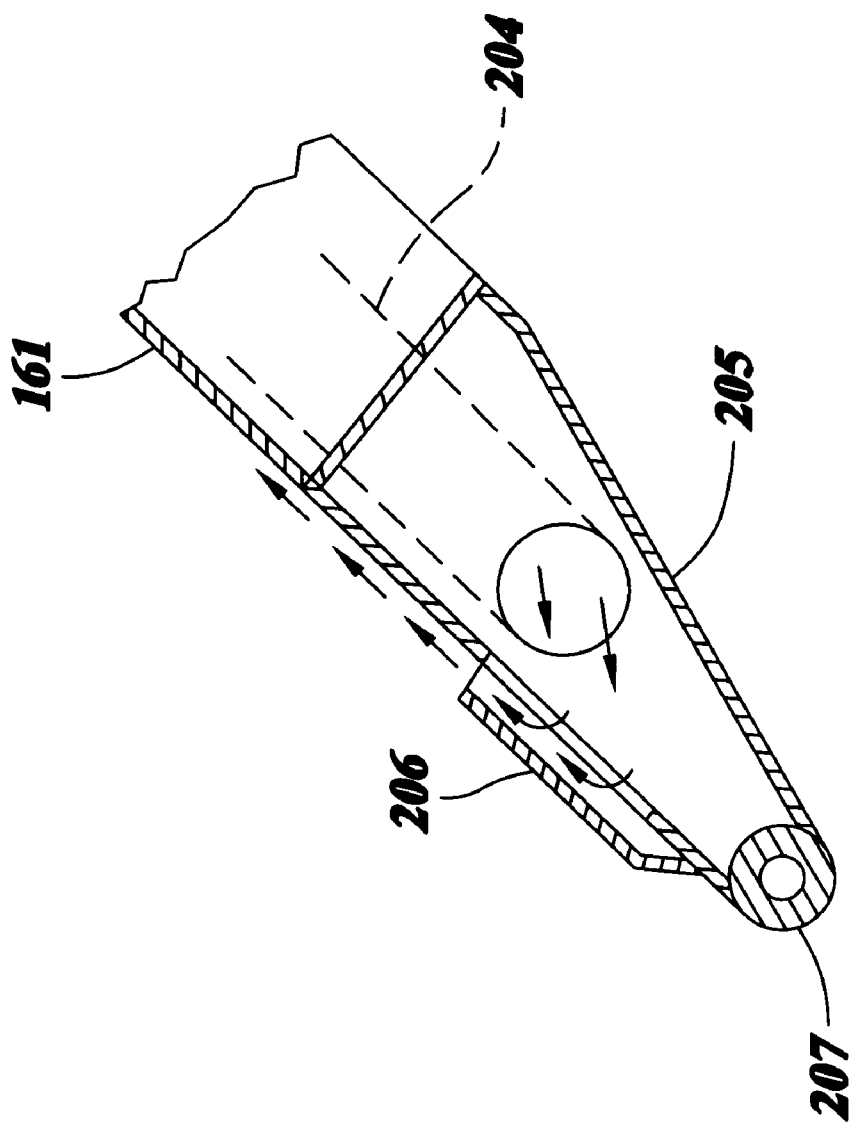
FIG. 13 is a longitudinal cross-sectional view of one of the air plenums of the air system of FIG. 12.

There may be a plurality of blowers 201, and a separate blower 201 may be provided for each air outlet 206, but in the present embodiment, a single blower 201 provides compressed air to all of the air outlets 206. As shown in FIG. 12, which illustrates the air system 200 in isolation, the discharge side of the blower 201 is connected by a duct 202 to a manifold 203 mounted beneath the first frame 110. A plurality of ducts 204 lead from the manifold 203 to plenums 205 for the individual air outlets 206. Each of the ducts 204 is connected to a hollow stem 203a projecting from the manifold 203. If there are more stems 203a than there are ducts, the unused stems 203a may be closed by suitable members, such as covers or plugs. Some portions of the ducts 204 or the connections between the ducts 204 and the stems 203a are preferably flexible to enable the ducts 204 to bend with respect to the manifold 203 when the second frame 120 is raised and lowered. The plenums 205 are secured to the front sides of protective covers 161 disposed atop the lower disks 153 of the picking mechanisms 150. The air outlets 206 are disposed on the top surfaces of the plenums 205. The ducts 204 may connect directly to the air outlets 206, but the plenums 205 serve as a convenient and compact mechanism for changing the direction of flow of the air through the ducts 204. The plenums 205 can also be shaped so as to help guide plants into the widthwise center of a picking mechanism 150. The front end of each plenum 205 may be reinforced by a rigid pipe 207, for example, to protect the plenum 205 from damage by impact when traveling close to the ground.

The air outlets 206 need not have any specific shape. In the present embodiment, each air outlet 206 is in the form of a deflector sitting atop an opening in the top surface of one of the plenums 205 and having an elongated rectangular opening about 5.5 to 6 inches wide and about ¼ inches tall through which an air stream is discharged. Examples of other possible structures for the air outlets 206 include nozzles, tubes, or holes in the top surfaces of the plenums 205. The openings in the air outlets 206 through which air streams are discharged need not be rectangular, and may be circular, oval, or various other polygonal or curved shapes.

The air streams from the air outlets 206 can be directed in any direction which enables them to carry peppers which have fallen off plants ahead of the picking mechanisms 150 to a location on the harvester where the peppers can be collected rather than falling to the ground. For example, the air stream from an air outlet 206 may be aimed towards one of the picking mechanisms 150, towards one of the conveyors 170, or towards a net or other member which catches the peppers and guides them to a suitable location. Any portion of one of the picking mechanisms 150 is generally a suitable location for the peppers to land upon. Good results have been obtained when the peppers are carried roughly 16–18 inches by the air streams to land on the lower regions of the picking mechanisms 150. Generally, the air outlets 206 will be oriented so that the air streams have both a horizontal component towards the rear of the harvester and a vertically upwards components so that peppers which fall into the air streams will be carried both upwards and backwards. However, depending upon the height of the pepper plants, it may be possible for the air streams to extend completely horizontally. Furthermore, if the harvester is traveling rapidly enough, the air streams may be directed vertically. In this case, peppers which fall into the air streams will be carried substantially vertically with substantially no horizontal velocity, but by the time the peppers fall down again, the picking mechanisms 150 will have moved to a position beneath the falling peppers so as to be able to collect them.

Even though the air streams will typically have a horizontal component, due to the upwards angle of the air streams and the stiffness of the pepper plants, the air streams will usually not cause the pepper plants to bend towards the picking mechanisms 150 to any significant extent.

The principle cause of peppers falling from a pepper plant during operation of the harvester is vibration of the plant caused by contact of any portion of the plant with one of the picking mechanisms 150. The vibration causes peppers which are loosely attached to the plant (typically the largest and ripest peppers) to fall off. Those peppers which fall off portions of the plant which have already entered one of the picking mechanisms 150 tend to fall onto the picking mechanism 150 and be collected. However, peppers which fall off portions of the plant which have yet to enter one of the picking mechanisms 160, such as the back of the plant (the portion facing away from the harvester) or the lateral sides, tend to fall onto the ground. Therefore, it is particularly desirable for the air streams to extend into the regions of the picker head 100 forward of the picking mechanisms 150 through which the plants pass so as to contact the back and lateral sides of plants which have entered partway into one of the picking mechanisms 150 and act on peppers which fall from the back and lateral sides. The air streams may first contact a plant before the plant has entered one of the picking mechanisms 150, or the air streams may be oriented so as to contact a plant only after some portion of the plant has entered one of the picking mechanisms 150, since there is little tendency for peppers to fall off a plant before the plant contacts and is vibrated by one of the picking mechanisms 150.

There is no restriction on the number of air outlets 206. Preferably there is at least one air outlet 206 for each row of plants being picked, and in the present embodiment, two air outlets 206 are provided for each row on opposite widthwise sides of the row. The air streams from the two air outlets 206 converge towards the center of the row so that each plant has an air stream directed at it from both widthwise sides as it enters one of the picking mechanisms 150. In the present embodiment, the air streams from a pair of air outlets 206 intersect with each other, i.e., contact each other roughly 10 inches ahead of the corresponding picking mechanism 150. Being so oriented, the two air streams will first contact a plant before the plant enters one picking mechanism 150 and will continue to contact the back and lateral sides of the plant as it enters the picking mechanism 150.

The angle with respect to the horizontal of the air streams from the air outlets 206 measured in a vertical plane depends upon the angle of the second frame 120 of the picker head 100 with respect to the horizontal. In general, an angle with respect to the horizontal in the range of approximately 30 to approximately 60 degrees is suitable for the air streams. FIG. 2 shows the second frame 120 at an angle of approximately 22.5 degrees with respect to the horizontal with the front end of each plenum 205 touching or within a few inches off the ground, and the air outlets 206 are sloped so that the air streams from the air outlets 206 extend at an angle of roughly 50 degrees to the horizontal. Upon exiting from the air outlets 206, the air streams extend parallel to the top surfaces of the plenums 205 and the covers 161 for the lower disks 153 and expand to form a cushion of air roughly 2 to 3 inches in thickness atop these members.

The velocity of the air streams from the air outlets 206 needed to carry the peppers in the air streams to a desired location on the harvester will depend upon the size and weight of the peppers, which will vary with the type of pepper, the growing conditions, the amount of moisture on the peppers, the ripeness of the peppers, and other conditions. Therefore, the blower 201 is preferably adjustable to enable the air stream velocity to be set to a value suitable for the current operating conditions.

The air streams from the air outlets 206 do not affect the operation of the picking mechanisms 150, and the harvester can travel along a row of peppers with the air system 200 in operation at the same speed as it would with the air system 200 turned off.

Compressed air from the blower 201 can be used not only to carry fallen peppers onto the harvester, it can also be used to urge materials up the conveyors 170 or to dislodge materials adhering to the brushes 165 of the picking mechanisms 150 and allow them to be deposited on the conveyors 170. As shown in FIG. 12, the illustrated air system 200 includes a duct 208 which extends from the manifold 203 to a tubular air outlet 209 disposed above the middle conveyor 170 for blowing air along the conveyor 170 and the brushes 165 of the picking mechanisms 150 adjoining the conveyor 170 towards the rear of the second frame 120. This air outlet 209 can be used instead of or in addition to the pushing mechanisms 180. The other conveyors 170 may be equipped with a similar air outlet 209 for compressed air.

The illustrated harvester can be used to harvest either one or two parallel rows of pepper plants at a time. The harvester is steered along the rows so that each row to be picked passes roughly midway between the two halves 150a, 150b of one of the picking mechanisms 150. Using the hydraulic cylinders 125, the front end of the second frame 120 is adjusted to a suitable height in accordance with the height of the pepper plants, the height of the peppers on the plants, or other parameters. With the picking mechanisms 150 driven at a desired speed, the harvester moves along the rows. As the rows of pepper plants enter the picking mechanisms 150, peppers on the plants are lifted upwards by the orbital motion of the fingers 157 on the bars 155 of the picking mechanisms 150 and are stripped from the plants. The detached peppers are prevented from falling to the ground between the fingers 157 by the brushes 165, which carry the peppers transversely onto the conveyors 170.

Twigs, leaves, and other debris stripped from the plants by the picking mechanisms 150 are also carried by the brushes 165 onto the conveyors 170. The items deposited on the conveyors 170 are carried upwards and backwards by the conveyors 170 and the pushing mechanisms 180 and discharged onto the conveyors 190 and 191 adjoining the rear ends of conveyors 170. These conveyors 190 and 191 then feed the peppers and debris into the mouth of the cleaner 14, in which the peppers are separated from the debris. The debris 23 drops out of the cleaner 14 onto the ground, while the cleaned peppers 22 are discharged from the rear end of the cleaner 14 onto conveyors 15 and 16 to be carried onto the trailer 17 for collection.

Peppers which fall from the pepper plants ahead of the picking mechanisms 150 due to vibration of the plants by the harvester are blown backwards before they strike the ground by the air streams from the air outlets 206 onto the picking mechanisms 150, for example, which transfer the peppers to the conveyors 170 in the same manner as the peppers which are picked by the picking mechanisms 150. Thus, virtually all of the peppers which are capable of being picked by the picker head 100 are collected with an extremely high yield much higher than that of a conventional pepper harvester. A harvester according to the present invention is therefore able to greatly increase the value of whatever crop it is used to harvest.

What is claimed is:

1. A pepper harvester comprising:
   a picking mechanism for picking peppers from a pepper plant and having a front end and a rear end;
   an air outlet located forward of the front end of the picking mechanism directing an air stream to blow peppers which have fallen from a plant being harvested towards a portion of the harvester which can collect the peppers; and
   an air supply which supplies compressed air to the air outlet.

2. A harvester as claimed in claim 1 wherein the air outlet directs the air stream to blow peppers towards the picking mechanism.

3. A harvester as claimed in claim 1 wherein the air stream is at an angle of approximately 0 to approximately 90 degrees to a horizontal plane.

4. A harvester as claimed in claim 3 wherein the air stream is at an angle of approximately 30 to 60 degrees to a horizontal plane.

5. A harvester as claimed in claim 4 wherein the air stream is at an angle of approximately 40 to 50 degrees to a horizontal plane.

6. A harvester as claimed in claim 1 comprising two air outlets each connected to the air source and oriented such that air streams from the two air outlets converge to the rear of the air outlets.

7. A harvester as claimed in claim 6 wherein the two air streams converge forward of the picking mechanism.

8. A harvester as claimed in claim 1 wherein the air stream has a velocity sufficient to carry a pepper onto the picking mechanism from a location between the air outlet and the picking mechanism.

9. A harvester as claimed in claim 1 wherein a velocity of the air stream is adjustable.

10. A harvester as claimed in claim 1 wherein the air outlet has a substantially rectangular opening for the air stream.

11. A harvester as claimed in claim 1 including a plenum in fluid communication with the air supply, wherein the air outlet is connected to the plenum.

12. A harvester as claimed in claim 1 wherein the air outlet is approximately 1 to approximately 5 inches off the ground.

13. A harvester as claimed in claim 12 wherein the air outlet is approximately 1 to approximately 3 inches off the ground.

14. A harvester as claimed in claim 1 further comprising a conveyor adjoining the picking mechanism and having a conveyor belt on which peppers picked by the picking mechanism are transported towards a rear of the harvester, and a first pushing mechanism adjoining the conveyor belt for pushing materials along the conveyor belt.

15. A harvester as claimed in claim 14 wherein the first pushing mechanism comprises a plurality of fingers extending above the conveyor belt and circulating along a path adjoining the conveyor belt.

16. A harvester as claimed in claim 15 wherein the first pushing mechanism includes a chain circulating along a path adjoining the conveyor belt and each of the fingers is secured to the chain.

17. A harvester as claimed in claim 1 wherein the picking mechanism includes a pair of first rotating disks and a pair of second rotating disks spaced from the first rotating disks in a fore and aft direction of the harvester, a plurality of elongated bars each having a first end rotatably connected to one of the first disks and a second end rotatably connected to one of the second disks and performing orbital movement as the disks rotate, and a plurality of fingers for plucking peppers from pepper plants attached to each of the bars, a spacing between the first disks being fixed and a spacing between the second disks being adjustable.

18. A harvester as claimed in claim 15 wherein each finger is spaced from an upper surface of the conveyor belt.

19. A harvester as claimed in claim 15 wherein the fingers are flexible so as to yield when contacting a branch or stem of a pepper plant on the conveyor belt.

20. A harvester as claimed in claim 19 wherein each finger comprises a flexible rubber body.

21. A harvester as claimed in claim 15 wherein the fingers circulate along the path at a greater speed than the conveyor belt.

22. A harvester as claimed in claim 14 including a second pushing mechanism adjoining the conveyor belt for pushing materials along the conveyor belt, the conveyor belt being disposed between the first and second pushing mechanisms.

23. A method of harvesting peppers from pepper plants comprising:
    moving a harvester having a picking mechanism along a path to pick peppers from pepper plants disposed along the path; and
    directing an air stream backwards from a location along the path ahead of the picking mechanism to blow peppers which drop from the pepper plants ahead of the picking mechanism to a portion of the harvester which can collect the peppers.

24. A method as claimed in claim 23 including blowing the peppers onto the picking mechanism.

25. A method as claimed in claim 23 including directing two air streams backwards towards the picking mechanism from opposite lateral sides of the path.

26. A method as claimed in claim 25 including directing the air streams so as to converge forward of the picking mechanism.

27. A method as claimed in claim 23 including varying a velocity of the air stream in accordance with a weight of the peppers.

28. A method as claimed in claim 27 including varying a velocity of the air stream in accordance with a dampness of the peppers.

29. A method as claimed in claim 23 including discharging the air stream from an opening in an air outlet approximately 1 to approximately 5 inches off the ground.

30. A method as claimed in claim 29 including discharging the air stream from an opening in an air outlet approximately 1 to approximately 3 inches off the ground.

31. A method as claimed in claim 23 including directing the air stream at an angle of approximately 0 to approximately 90 degrees to a horizontal plane.

32. A method as claimed in claim 31 including directing the air stream at an angle of approximately 30 to 60 degrees to a horizontal plane.

33. A method as claimed in claim 32 including directing the air stream at an angle of approximately 40 to 50 degrees to a horizontal plane.

34. A method of harvesting fruits or vegetables from plants comprising:

moving a harvester having a picking mechanism along a path to pick fruits or vegetables from plants disposed along the path; and directing an air stream backwards from a location along the path ahead of the picking mechanism to blow fruits or vegetables which drop from the plants ahead of the picking mechanism to a portion of the harvester which can collect the fruits or vegetables.

35. A harvester comprising:

a picking mechanism for picking fruits or vegetables from plants having a front end and a rear end;

an air outlet located forward of the front end of the picking mechanism directing an air stream to blow fruits or vegetables which have fallen from a plant being harvested towards a portion of the harvester which can collect the fruits or vegetables; and an air supply which supplies compressed air to the air outlet.

36. A pepper harvester comprising:

a frame; and a picking mechanism for picking peppers including a pair of first disks rotatably mounted on the frame and a pair of second disks rotatably mounted on the frame and spaced from the first rotating disks in a fore and aft direction of the frame, a plurality of elongated bars each having a first end rotatably connected to one of the first disks and a second end rotatably connected to one of the second disks and performing orbital movement as the disks rotate, a drive mechanism for rotating the disks, and a plurality of fingers for plucking peppers from pepper plants attached to each of the bars and extending in a widthwise direction of the frame, a spacing between the first disks being fixed in a widthwise direction of the frame and a spacing between the second disks being adjustable in the widthwise direction of the frame.

37. A pepper harvester comprising:

a picking mechanism for picking peppers from a pepper plant and having a front end and a rear end;

a conveyor adjoining the picking mechanism and having a conveyor belt on which peppers picked by the picking mechanism are transported in a fore and aft direction of the harvester; and a first pushing mechanism adjoining the conveyor belt for pushing materials along the conveyor belt.

38. A harvester as claimed in claim 37 wherein the first pushing mechanism comprises a plurality of fingers extending above the conveyor belt and circulating along a path adjoining the conveyor belt.

39. A harvester as claimed in claim 38 wherein the first pushing mechanism includes a chain circulating along a path adjoining the conveyor belt and each of the fingers is secured to the chain.

40. A harvester as claimed in claim 38 wherein each finger is spaced from an upper surface of the conveyor belt.

41. A harvester as claimed in claim 38 wherein the fingers are flexible so as to yield when contacting a branch or stem of a pepper plant on the conveyor belt.

42. A harvester as claimed in claim 41 wherein each finger comprises a flexible rubber body.

43. A harvester as claimed in claim 38 wherein the fingers circulate along the path at a greater speed than the conveyor belt.

44. A harvester as claimed in claim 37 including a second pushing mechanism adjoining the conveyor belt for pushing materials along the conveyor belt, the conveyor belt being disposed between the first and second pushing mechanisms.

* * * * *